United States Patent
Dementev et al.

(10) Patent No.: US 10,523,526 B2
(45) Date of Patent: Dec. 31, 2019

(54) SYSTEM AND METHOD FOR MANAGING SERVICES AND LICENSES USING A BLOCKCHAIN NETWORK

(71) Applicant: Acronis International GmbH, Schaffhausen (CH)

(72) Inventors: Denis Dementev, Moscow (RU); Victor Lysenko, Moscow (RU); Mark Shmulevich, Moscow (RU); Stanislav Protasov, Moscow (RU); Serguei Beloussov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 192 days.

(21) Appl. No.: 15/392,728

(22) Filed: Dec. 28, 2016

(65) Prior Publication Data

US 2018/0183687 A1 Jun. 28, 2018

(51) Int. Cl.
| | |
|---|---|
| H04L 29/06 | (2006.01) |
| H04L 12/24 | (2006.01) |
| H04L 29/08 | (2006.01) |
| G06F 21/10 | (2013.01) |
| G06F 16/22 | (2019.01) |
| G06F 21/64 | (2013.01) |

(52) U.S. Cl.
CPC .............. *H04L 41/50* (2013.01); *G06F 16/22* (2019.01); *G06F 21/105* (2013.01); *G06F 21/64* (2013.01); *H04L 67/1095* (2013.01)

(58) Field of Classification Search
CPC ....................................................... H04L 41/50
See application file for complete search history.

(56) References Cited

U.S. PATENT DOCUMENTS

2018/0157825 A1 * 6/2018 Eksten .................... G06F 21/51

FOREIGN PATENT DOCUMENTS

WO    WO-2018069566 A1 *  4/2018  ............. G06F 21/34

* cited by examiner

*Primary Examiner* — Adnan M Mirza
(74) *Attorney, Agent, or Firm* — Arent Fox LLP; Michael Fainberg

(57) ABSTRACT

A system and method provided for managing services and licenses using blockchain technology. An exemplary method includes storing an operator license relating to an operator node associated with a vendor, where the operator license indicates transactional authority of the operator node. Moreover, the method includes executing a transaction relating to a service and/or a license provided to client device; transmitting data relating to the operator license to a blockchain network in which a node in the blockchain network adds the data relating to the operator license as one or more blocks in an existing blockchain; and replicating the transaction to at least one additional node in the blockchain network. As a result, the existing blockchain can be used to verify the transaction authority of the operator node and the transaction between the client device and the operator node.

20 Claims, 6 Drawing Sheets

SYSTEM AND METHOD FOR MANAGING SERVICES AND LICENSES USING A BLOCKCHAIN NETWORK

FIELD OF TECHNOLOGY

The present disclosure generally relates to service and license management, and, more specifically to a method and system for managing services and licenses using blockchain technology.

BACKGROUND

Vendors such as software providers, data storage providers, and the like, that provide services and issue licenses to their customers need to manage services and licenses in their systems. Traditionally, vendors would manage this task by building a distributed database with a tree-like structure, with a root node hosted by vendor.

FIG. 1 illustrates a block diagram of an exemplary conventional distributed database with a tree-like structure. As shown the distributed database 10 includes a root master node 20, a plurality of tree nodes 30A and 30B, and a plurality of leaf nodes 40A-40E. Each node is a computing device (e.g., a server, database, etc.) that includes memory configured to store relevant information regarding the services and licenses.

In traditional distributed database such as database 10, the root master node 20 is configured to manage and approve all the changes to data in the entire tree, including all other nodes 30A-30B and 40A-40E. The flow of changes at each node are indicated by a solid arrow. As shown, the changes in data made in each node first arrive at the root master node 20 and are then replicated (i.e., the dashed arrows) along the tree from the root master node 20 to the branches (i.e., tree nodes 30A and 30B) and finally to the leaf nodes (i.e., leaf nodes 40A-40E).

The approach of the distributed database shown in FIG. 1 is straightforward and allows data changes to be controlled easily. However, there are also technical disadvantages. For example, to issue any update to data, each tree node needs to maintain connectivity to the root master node 20. If a connection is not available (e.g., due to network failure, or security policies), then the change cannot be made. Moreover, the root master node 20 has to manage changes from all nodes and becomes a bottleneck as indicated by the number of inputs and outputs to and from root master node 20. As a result, replication of changes from the root master node 20 may take significant time for complex trees. Furthermore, the changes made by one leaf of one branch are not visible to other branches until the change gets replicated through the root master node 20. In fact, even the changes made by leafs of the same branch are not visible to other leafs in the branch until the changes get replicated through the root master node 20.

Some designs have attempted to address these technical limitations by adding cross-branch replication and propagation of changes up to the root master node 20 through branches. However, such designs add a lot of complexity to the system and makes it expensive to build and maintain such a database.

Currently, for distributed databases such as database 20, there exists a need to verify that a node issuing a data change has authority to make such a change. Validating authority of a node in a different branch could be quite challenging and may require the whole tree of nodes to be replicated across the tree along with the data. Moreover, there is a need to guarantee that changed data is not corrupted or intentionally modified on the way up to root master node 20. This can be even more challenging if the data is passing through nodes deployed in the environment that are not controlled by vendor.

SUMMARY

In view of the foregoing problems and existing technologies, it is desired to provide a system and method for managing services and licenses using blockchain technology.

According to one aspect, a method is provided for utilizing blockchain technology for managing services and licenses. In this aspect, the method includes storing, in an electronic database, an operator license relating to an operator node associated with a vendor, the operator license indicating transactional authority of the operator node; executing, by a processor of the operator node, a transaction relating to at least one of a service and a license provided to client device; transmitting data relating to the data relating to the operator license to a blockchain network in which at least one node in the blockchain network adds the data relating to the operator license as one or more blocks in an existing blockchain; and replicating the transaction to at least one additional node in the blockchain network, such that the existing blockchain can be used to verify the transaction authority of the operator node and the transaction between the client device and the operator node.

According to another aspect, the operator node is the at least one node in the blockchain network.

According to another aspect, the method further includes transmitting additional data to the at least one node in the blockchain network, the additional data relating to at least one of a timestamp, a transaction type and vendor custom properties of the transaction.

According to another aspect, the timestamp indicates a time and date when the transaction was executed between the client device and the vendor.

According to another aspect, the method further includes transmitting a vendor operator license associated with transactional authority of the vendor to the blockchain network to be added as the one or more blocks in the existing blockchain.

According to another aspect, the method further includes executing of the transaction includes providing a client license and purchase transaction to the client device, wherein the purchase transaction includes the vendor operator license.

According to another aspect, the client device is configured to validate the transaction based on the purchase transaction and the one or more blocks in the existing blockchain.

According to an exemplary aspect, a system is provided for utilizing blockchain technology for managing services and licenses. In this aspect, the system includes an electronic database configured to store an operator license relating to an operator node associated with a vendor, the operator license indicating transactional authority of the operator node; and a processor of the operator node being configured to execute a transaction relating to at least one of a service and a license provided to client device, transmit data relating to the data relating to the operator license to a blockchain network in which at least one node in the blockchain network adds the data relating to the operator license as one or more blocks in an existing blockchain, and cause the transaction to be replicated by at least one additional node in the blockchain network, such that the existing blockchain can be used to verify the transaction authority of the operator node and the transaction between the client device and the operator node.

According to another aspect, a non-transitory computer readable medium comprising computer executable instructions for utilizing blockchain technology for managing services and licenses. In this aspect, instructions are included for storing, in an electronic database, an operator license relating to an operator node associated with a vendor, the operator license indicating transactional authority of the operator node; executing, by a processor of the operator node, a transaction relating to at least one of a service and a license provided to client device; transmitting data relating to the data relating to the operator license to a blockchain network in which at least one node in the blockchain network adds the data relating to the operator license as one or more blocks in an existing blockchain; and replicating the transaction to at least one additional node in the blockchain network, such that the existing blockchain can be used to verify the transaction authority of the operator node and the transaction between the client device and the operator node.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
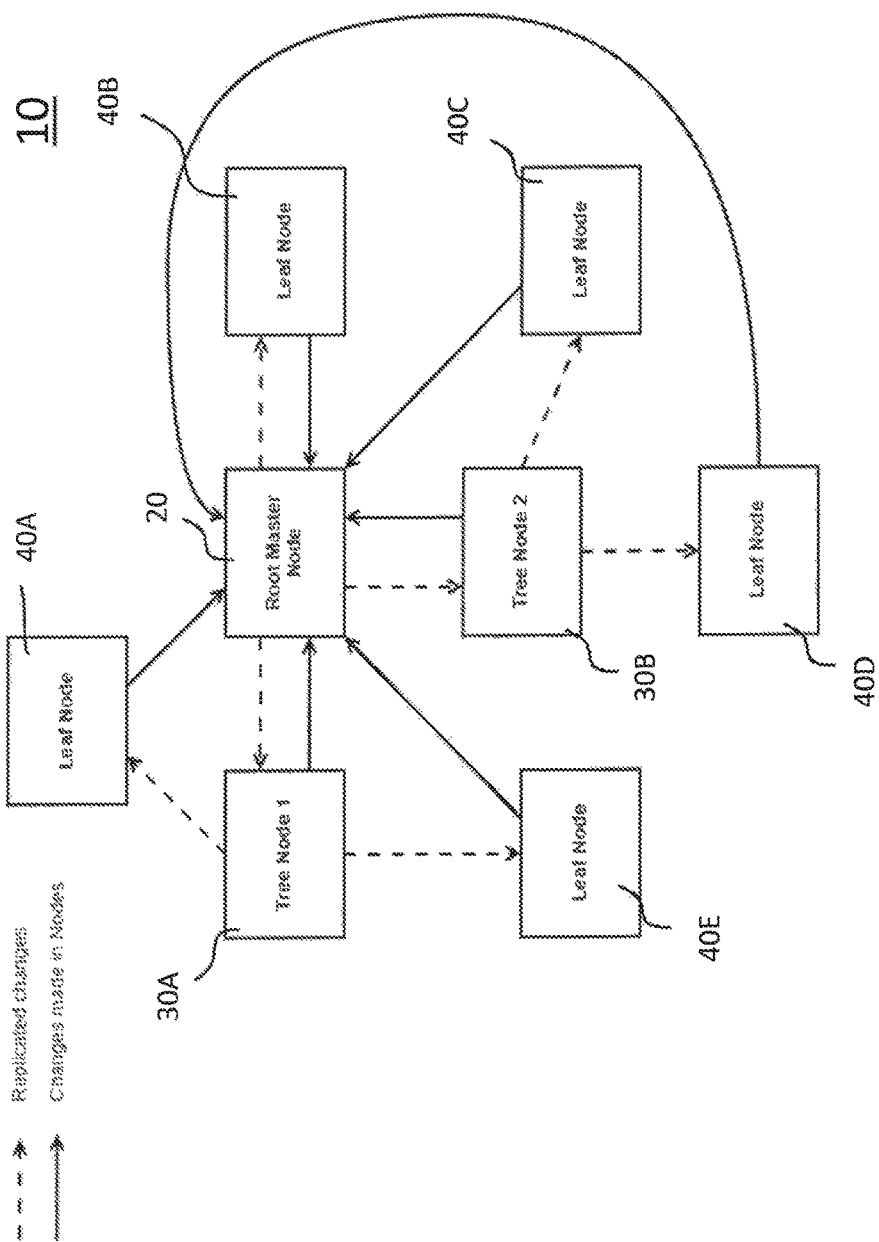
FIG. 1 illustrates a block diagram of an exemplary conventional distributed database with a tree-like structure.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

The present disclosure is directed to a method and system for managing services and licenses using blockchain technology.

Figure 2:
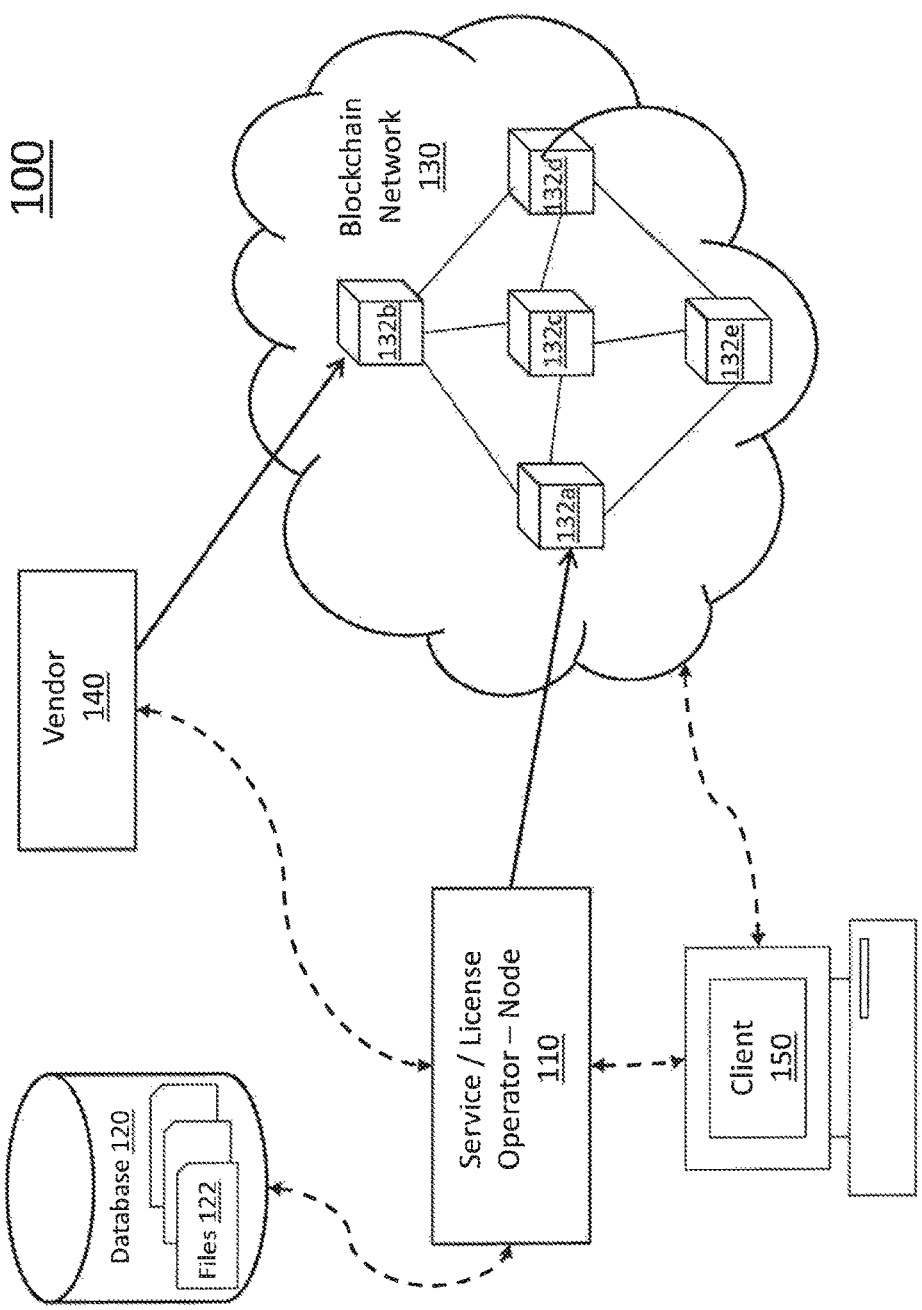
FIG. 2 illustrates a block diagram of a system for storing data using blockchain technology according to an exemplary aspect.

FIG. 2 illustrates a block diagram of a system for storing data using blockchain technology according to an exemplary aspect. As shown, the system 100 generally includes a service/license operator 110 (referred to herein as "node 110" or "operator node 110" or "shop node 110"), which can generally be considered a computer node. Moreover, although only a single node 110 is shown, it should be appreciated that the system 100 can include a plurality of such nodes that form the network. As further shown, the system 100 includes a vendor 140 (which can also be considered a node of system 100) that is configured to issue transactions to operator node 110 as described in detail below. Each of the nodes of system 100 form part of a distributed storage system for a service provider (e.g., software application provider, data storage provider or the like) according to one exemplary aspect.

Thus, according to one exemplary aspect, the vendor 140 (which can be a vendor of software applications, data storage or the like, for example) can be communicatively coupled to one or a plurality of service/license operator nodes 110 that are operators for providing services, software applications, licenses, etc., to a plurality of customers/clients, such as client device 150, which can be any type of conventional computing device, such as a personal computer, laptop, smartphone, tablet, or the like, for example. In the exemplary aspect, the client device 150 is configured to access one or more nodes in the blockchain network 130 in order to validate the service or license obtained from operator node 110, as will become more apparent from the detailed discussion below.

Moreover, the details of the operator node 110 will be discussed below with respect to FIG. 3, but generally the node 110 is configured to issue changes to service and license agreements and send those changes to a node of blockchain network 130. Similar to client device 150, operator node 110 may in general be any type of computing device, such as a laptop, a desktop, a tablet, a mobile phone and the like. Exemplary hardware details of the exemplary operator node 110 (and vendor node 140, for example) will be described below with respect to FIG. 6.

In addition, system 100 further includes database 120 and blockchain network 130. According to the exemplary aspect, the database 120 can generally include hardware and software components configured to manage various storage resources within the computing environment. For example, the database 120 can include one or more data storage devices (e.g., hard disk drives, optical drives, magnetic tape drives and/or the like) and storage management software that provides an interface to the one or more data storage devices. The database 120, which can be a data cloud storage service according to one aspect, facilitates temporary and/or permanent storage of computer data, including data files 122 of node 110. According to the exemplary aspect, the computer data of data files 122 may be any type of electronic, digital data generated and/or stored by a computer. For example, the computer data can represent text data, executable program code, audio, video or image data, or any other type of digital data. In the exemplary aspect, these data files 122 correspond to services and/or licenses (e.g., service level agreements or "SLAs") that are provided to customers (e.g., client device 15) of the operator node 110. Moreover, as will be discussed in detail below, the node 110 is configured to manage the services and licenses in database 120 and transmit updates (i.e., transactions or changes) to this information to blockchain network 130. Additional information can be stored include the file name, size in bytes and storage transaction number of the file.

According to an exemplary aspect, the blockchain network 130 can be an existing (public or private) distributed network formed from a plurality of nodes or computers 132a-132e, for example. In general, blockchain technology is most widely known as the technology behind the popular cryptocurrency, Bitcoin. A blockchain creates a history of data deposits, messages, or transactions in a series of blocks where each block contains a mathematical summary, called a hash, of the previous block. In turn, this process creates a chain where any changes made to a block will change that block's hash, which must be recomputed and stored in the next block. This changes the hash of the next block, which must also be recomputed and so on until the end of the chain.

In the exemplary aspect, blockchain network 130 maintains a continuously-growing list of data records hardened against tampering and revision and is composed of data structure blocks that exclusively hold the data received from the node 110 (and other nodes in the system) according to the exemplary aspect. In particular, after any changes are executed by operator of node 110 to any of files 122, the node transmits such data (and related data or metadata) to the blockchain network 130. The blockchain network 130 records this transaction in a block and confirms when and in what sequence the data transactions enter and are logged in the existing blockchain. Preferably, every node (e.g., computers 132a-132e) in the decentralized system has a copy of the growing blockchain. This design avoids the need to have a centralized database managed by a trusted third party. Moreover, each of the nodes 132a-132e can validate the data, add hash values to their copy of the blockchain and then broadcast these additions to other nodes in accordance with existing blockchain methodologies. In general different blockchain networks have different formats for descriptions of transactions. Thus, while all blockchain networks are generally configured to include hash values of the file, other fields can vary from network to network. In one aspect, node 110 itself forms a node within blockchain network 130 (e.g., computing device 132a and node 110 are the same computing device forming a node in blockchain network 130). Moreover, in a further aspect, vendor 140 forms another node within the blockchain network 130 (e.g., computing device 132b and vendor 140 are the same computing device forming a node in blockchain network 130). Thus, in the exemplary aspect, each of the solid arrows indicate that the operator node 110 and computing device 132a are the same node and likewise vendor 140 and computing device 132b are the same node.

According to the exemplary aspect, each of the components of system 100 shown in FIG. 2 is configured to transmit data across a network. As shown, the exemplary communication is illustrated as two-way dashed arrows. The applicable network can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet or intranet using various communications infrastructure such as Ethernet, WiFi and the like.

Figure 3:
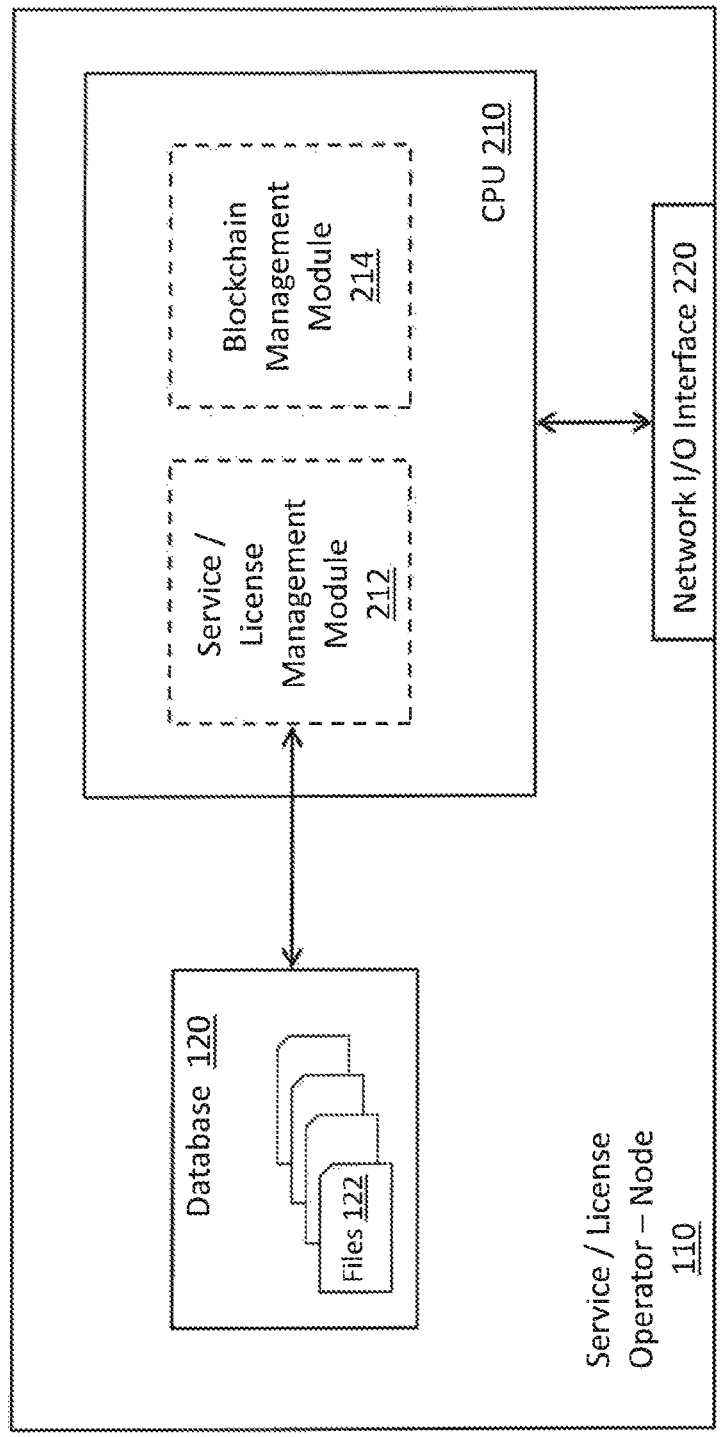
FIG. 3 illustrates a block diagram of the node of the system shown in FIG. 2 for the managing of services and licenses using blockchain technology according to an exemplary aspect.

FIG. 3 illustrates a block diagram of the node 110 of the system shown in FIG. 2 for the managing of services and licenses using blockchain technology according to an exemplary aspect. As noted above, the operator node 110 is a computing device of a service (e.g., data storage) and/or license operator that is provided to change the states and properties of service(s) and/or license(s) between customers 150 and a vendor 140 of software applications, file storage, and the like, according to an exemplary aspect. It should be appreciated that vendor node 140 can include the same or similar components as shown in FIG. 3 according to one exemplary aspect.

As shown, the operator node 110 includes a central processing unit ("CPU") 210 or processor that is provided to, among other things, execute a service/license management module 212 and a blockchain management module 214. In this aspect, the service/license management module 212 and the blockchain management 214 include software code (e.g., processor executable instructions) in memory, which may be configured to execute/facilitate the storing and managing of data files 122 (i.e., services and licenses) according to an exemplary embodiment. Moreover, node 110 includes a conventional network input/output ("I/O") interface 220 configured to communicate with customers, vendors, blockchain network 130, and the like. Although database 120 is shown to be part of node 110 in the exemplary aspect, database 120 and node 110 can be separate components remotely coupled to each other according to another aspect.

As used herein, the term "module" generally refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

According to the exemplary aspect, each license operator (e.g., node 110) is allowed to make only certain changes to service(s) and/or license(s). In this aspect, the list of changes and/or operations that are allowed is defined in an operator license that is issued to the license operator (i.e., node 110) by the vendor 140 of the distributed system. In other words, the vendor 140 of the service, software, etc., can define in vendor custom properties of the license transaction of the license to the operator node 110, what transactions the license operator (i.e., node 110) can issue to clients (e.g., client device 150). An exemplary flow of the process includes license vendor 140 issuing an operator license to a shop node (e.g., operator node 110), for example, that is then allowed to issue purchase transactions (as discussed below). Thus, the shop node 110 gets the license operator license issued above. For every other license that shop node 110 has in its database 120, it can issue a purchase transaction to its clients.

Figure 4:
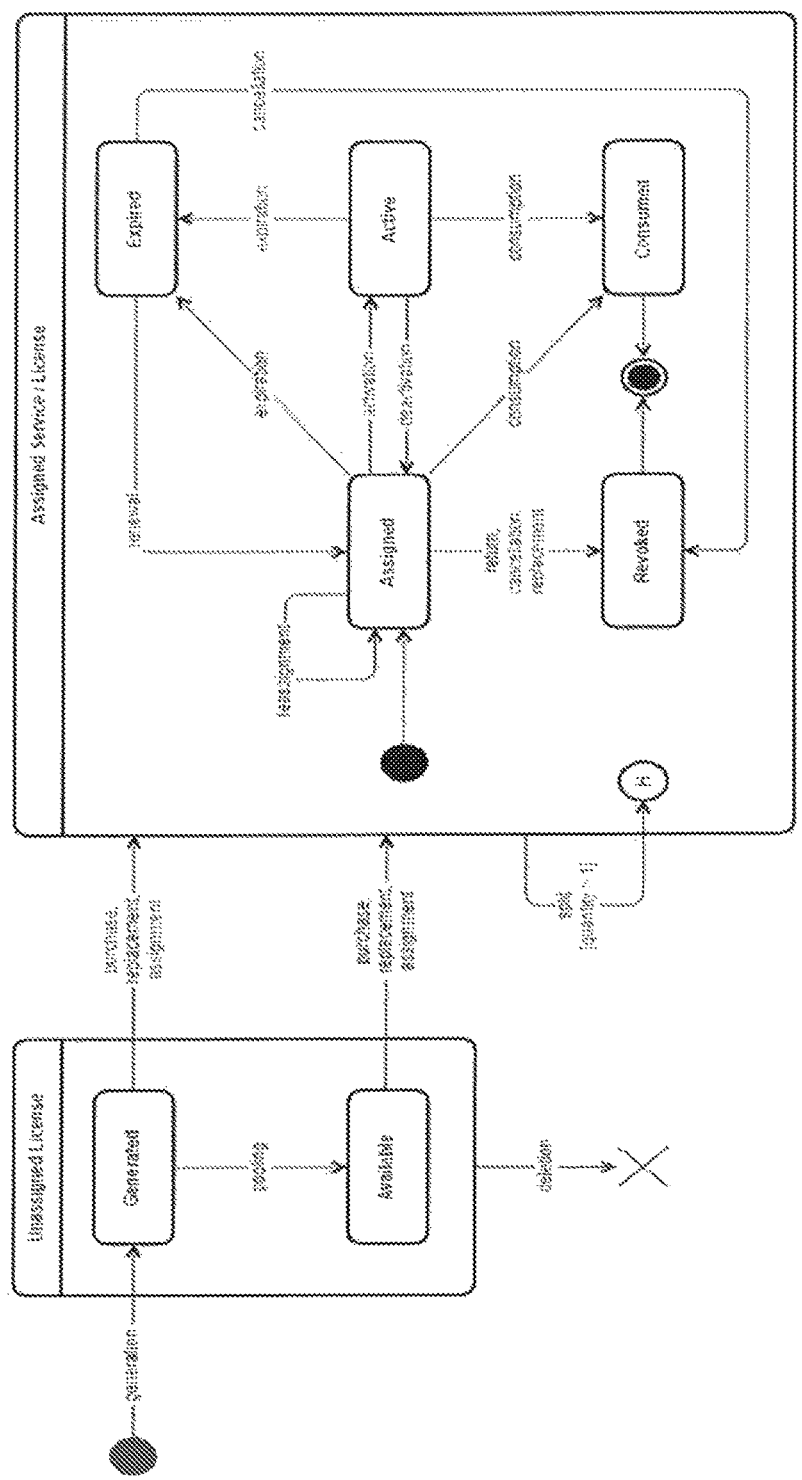
FIG. 4 illustrates a block diagram in UML ("Unified Modeling Language") of a service/license state diagram according to an exemplary aspect.

FIG. 4, discussed in detail below, illustrates examples of a transaction that includes vendor custom properties that define allowed transactions, such as a "Generate" or "Purchase" transaction. In one aspect, the "Generate" vendor property establishes the right from the vendor 140 that the operator node 110 can generate the service (e.g., a software license for software application sold to client device 110). Moreover, the "Purchase" vendor property establishes the right from vendor 140 that the operator node 110 can only issue a purchase transaction to the client device 110 (e.g., the client device 150 can purchase the license from the operator/shop node 110). Moreover, in the exemplary aspect, the service/license management module 212 of node 110 must then validate what operations the license operator (i.e., node 110) is allowed to issue and issue only those transactions. In one refinement of this aspect, the license operator (i.e., node 110) may have a license that allows it to issue any transaction.

In one example, the vendor 140 may issue an operator license that is received by operator/shop node 110 and stored in database 120 by service/license management module 212. According to the exemplary aspect, the operator license is then added by the vendor 140 in a block of blockchain network 130 as an identified change. Because this operator license has been added to blockchain network 130, any other node (and/or computing device 150) can easily validate if an operator node 110 was licensed for making a certain change by examining the operator license included in chain block.

In one refinement of this exemplary aspect, the license operator license of the operator node 110 issuing a transaction is always included in the license/service transaction to the blockchain network 130. Because the license is included, the other nodes of the blockchain network (e.g., nodes 132b-132e) and/or client device 150 can validate if the license operator that issued a transaction was allowed to issue it, by looking at the license of the license operator attached to the transaction. Moreover, if the license operator (i.e., node 110) was not allowed to issue a transaction according to its license, then the other nodes on the blockchain network (e.g., nodes 132b-132e) should consider the transaction as fraud and not valid, and discard the block that contains the transaction.

Thus, according to one example, a vendor operator license that allows the operator node 110 to issue all transactions (including Generate transaction) is distributed across blockchain network 130. Moreover, the vendor 140 may issue a "purchase only" operator license to a shop node. The license "Generate" transaction contains vendor custom properties that allow the licensee to issue "Purchase" transactions only. It also contains the vendor operator license that proves that vendor is allowed to issue "Generate" transactions. In one aspect, the shop operator license may or may not be distributed across blockchain network 130. Next, the vendor 150 may issue one or more client licenses and distribute the license(s) to shop node (e.g., operator node 110). In turn, the node 110 can issue a "Purchase" transaction for a client license to a client device 150 previously distributed by vendor 140, which includes its license operator license, which is in turn contains a "Generate" transaction issued by vendor as discussed above. Furthermore, the shop node 110 can distribute the client license with a "Purchase" transaction included in it to the client 150. In the exemplary aspect, each of these transactions is included in the blockchain of blockchain network 130. As such, the client device 150 can then independently validate if the shop node (e.g., node 110) was eligible for issuing the "Purchase" transaction by looking at the "Purchase" transaction in the blockchain, which includes the shop operator license, which in turn includes the "Generate" transaction issued by vendor 140, which in turn includes the vendor operator license. Because the vendor operator license was previously distributed to the blockchain network 130, the client 150 can validate if client license issued by the shop node 110 is valid.

According to this example, because the vendor 140 was eligible to issue an operator license that allows "Purchase" transactions to be issued by shop node 110, the shop node operator license is considered to be valid (and in fact can be added as to client database 120). Moreover, because the "Generate" transaction of the client license was issued by the vendor 140 who is allowed to issue "Generate" transaction according to his license operator license, the "Generate" transaction of the client license is considered to be valid by client device 150. Finally, because the shop node operator license is valid and allows "Purchase" transactions to be issued, the "Purchase" transaction of the client license is considered to be valid, and is accepted by the client device 150. Advantageously, this methodology enables the client device 150 to independently verify the validity of the service/license (e.g., a software license) issued by operator node 110 by accessing blockchain network 130 since each of the transactions has been recorded in the blockchain network 130 when each transaction is executed.

According to a refinement of the exemplary aspect, node 110 is configured to make any changes to services and/or licenses stored in database 120 via service/license management module 212 and issue any such change to blockchain network 130, via blockchain management module 214, assuming node 110 is authorized to make such a change as specified in the applicable operator license provided by vendor 140. In this aspect, any authoritative change made in any node (e.g., node 110) of system 100 becomes a part of blockchain and becomes effective immediately. As a result, there is no need for a change to pass through a root node (as discussed above) and be replicated down the tree to become effective.

Moreover, as changes become effective immediately and can be verified by any node at any time, they can be replicated between nodes directly using the blockchain network 130. The replication can be done asynchronously and connectivity failures between nodes only delay the replication, but do not cause operation failure. According to an example aspect, each vendor can determine which replication process to use. In general any modern network based process can be implemented. For example, vendor license operator license can be distributed along with the client software, as a part of it, or as a separate file. Distributing even just a vendor operator license to all clients (by way of the blockchain network 130, for example) should be sufficient for any client to validate authority of an operator node 110, as discussed above, for example. Moreover, in one aspect, a vendor can provide a public service to validate authority of client licenses or license operator licenses. Any client or license operator can query this server and push updated block chains to this server.

According to the exemplary aspect, by using the blockchain network 130, any node can verify authority of the change. In other words, authority can be granted and validated using the same blockchain technology, for example, by issuing licenses (i.e., the operator licenses) that allow the node to make changes to other licenses (e.g., customer licenses). Furthermore, data that is issued to the blockchain network 130 cannot be corrupted or modified during data replication and any change can easily be detected and the corrupted block chain can be discarded as would be appreciated to one skilled in the art.

FIG. 4 illustrates a block diagram in UML ("Unified Modeling Language") of a service/license state diagram according to an exemplary aspect. It is contemplated that each arrow shown can be considered a transition, which, in other words, is an executed transaction (i.e., a change) between a customer and a vendor or service operator that can be recorded in the blockchain network 130 by blockchain management module 214 of node 110, for example. For example, when an unassigned license is purchased by, replaced or assigned to a customer, the operator of node 110 will cause this transaction to be added to a block (e.g., node 132a) of blockchain network 130. In the exemplary aspect, this action is performed automatically by blockchain management module 214. In another aspect, this action is performed at the request of an actual administrator of service/license operator of node 110. Other actions include activation, deactivation, expiration, reassignment, consumption, and the like, and should be well understood to those skilled in the art. Thus, the details of such transactions will not be described in detail. Importantly, each of the transactions can be separately stored in database 120 as one or more files 122.

The following Table 1 illustrates a listing of services and/or license properties that are recorded as part of a transaction (i.e., a change) in a block of the blockchain network 130:

TABLE 1

| Name | Required | Description |
| --- | --- | --- |
| Timestamp | Yes | Data and time change was made. |
| Transaction Type | Yes | Type of Transaction |
| Operator License | Yes | The license of the operator that made the change |
| Vendor Custom Properties | No | Any additional properties. |

Thus, according to Table 1, each time an operator provides, updates, cancels, or the like, a service and/or license (e.g., a software license, service level agreement or the like) with a customer (i.e., executes a transaction), the operator (e.g., node 110) will store all or part of the information stored in Table 1 into database 120 as one or more files 122. For example, as shown, the metadata relating to the actual transaction will include the transaction timestamp when the change was executed, the type of transaction (e.g., exemplary transactions shown in FIG. 4), an operator license of the node (e.g., node 110) that executed the transaction, and/or any additional property the vendor may need to track for a transaction. Moreover, according to one exemplary aspect, the transaction metadata may include an indication as to whether such properties are required or not required as shown.

Thus, according to the exemplary aspect, a system and method is provided for managing services and licenses using blockchain technology. As described above, each transaction between each node (in a distributed system), for example, node 110 and a corresponding customer (e.g., client device 150) will be issued to a block of blockchain network 130 along with corresponding metadata about the transaction, such as the information shown in Table 1 (above). As described above, the disclosed system and method provides for a number of technical advantages over the conventional distributed databased currently used as explained above with respect to FIG. 1.

Figure 5:
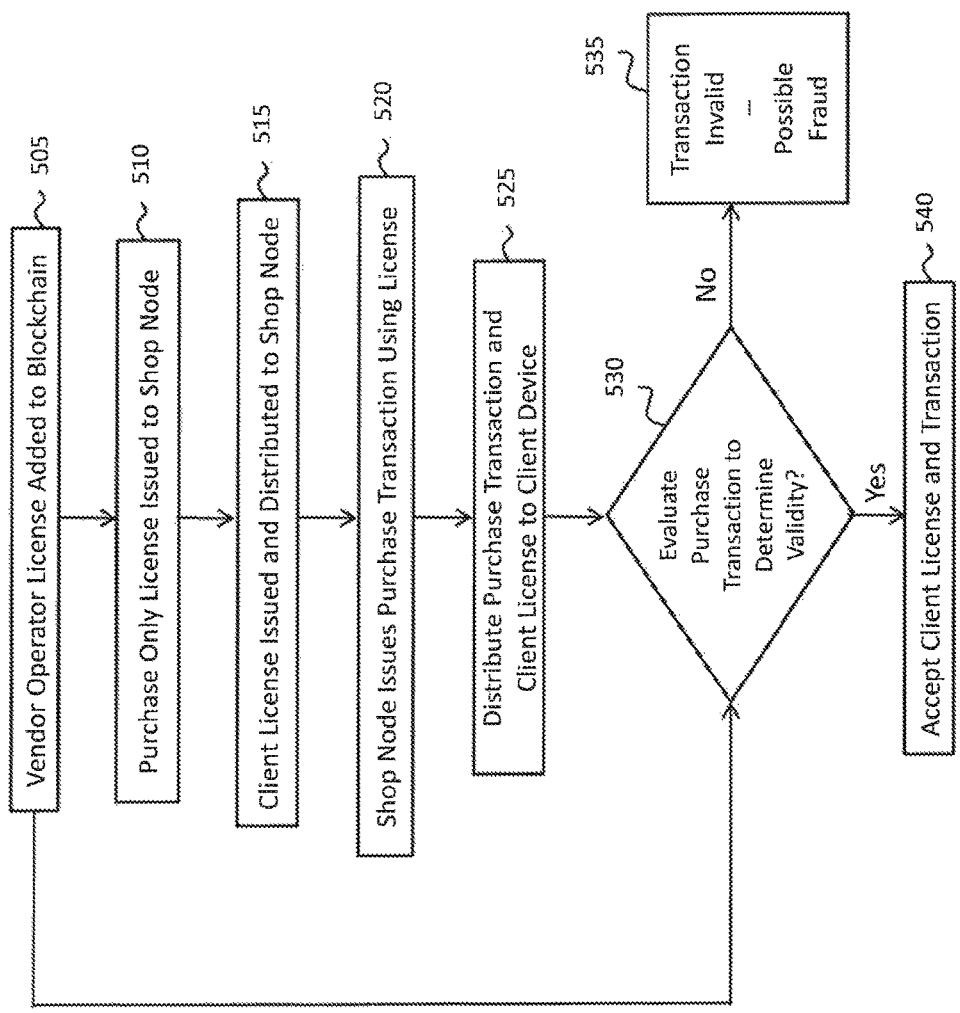
FIG. 5 illustrates a flowchart for a method for storing data using blockchain technology according to an exemplary aspect.

FIG. 5 illustrates a flowchart for a method for storing data using blockchain technology according to an exemplary aspect. It should be appreciated that the follow description of the exemplary method makes reference to certain components described above with respect to the foregoing figures.

Initially, as shown at step 505, a vendor operator license is issued by a service/product supplier (e.g., a software application company) to a vendor that defines the types of transactions the vendor (e.g., vendor 140) is entitled to perform. This vendor operator license is recorded in an existing (or new) blockchain of a blockchain network 130. In one exemplary, the vendor operator license allows the vendor 140 to issue all transactions (including "Generate" transaction). Next, at step 510, the vendor 140 issues a "purchase only" operator license to one or a plurality of shop nodes (e.g., operator node 110). Specifically, it is contemplated that the license "Generate" transaction contains vendor custom properties that allow the licensee to issue "Purchase" transactions only. In addition, it also contains the vendor operator license provided at step 505 that proves that vendor is allowed to issue "Generate" transactions.

Then, at step 515, the vendor 140 issues a client license (for a software application, for example) and distributes the client license to shop node 110. In response, the shop node 110 issues a "Purchase" transaction for this client license that includes its license operator license, which is in turn contains a "Generate" transaction issued by vendor 140. At step 525, the shop node distributes the client license with a purchase transaction included in it to a client device 150. For example, if a client device 150 is seeking to purchase the service/product, it may contact shop node 110 to download the software application, access the service, etc. Thus, at step 525, the shop node 110 may provide the corresponding client license (with the purchase transaction) to the client device 150.

Next at step 530, the client device 150 then can validate if the shop node 110 was eligible for issuing the "Purchase" transaction by analyzing the "Purchase" transaction received from shop node 110, which includes the shop operator license, which in turn include the "Generate" transaction issued by vendor 140, which in turn include the vendor operator license. As shown, because the vendor operator license was initially issued to the blockchain network 130, the client device 150 can use this information to independently verify the transaction (i.e., the legitimacy of the client license for the software application) based on the Purchase transaction received form the shop node 110. In this case, because the vendor 140 was eligible to issue an operator license that allows to issue "Purchase" transactions, the shop operator license is considered to be valid. Moreover, because the "Generate" transaction of the client license was issued by vendor 140 who is allowed to issue "Generate" transactions according to the vendor operator license, the "Generate" transaction of the client license is considered to be valid by the client device 150. Moreover, because the shop operator license of shop node 110 is valid and allows it to issue "Purchase" transactions, the "Purchase" transaction of the client license is considered to be valid, and is accepted by the client device 110 at step 540. Alternatively, if any of these transactions cannot be validated based on the blockchain (e.g., the vendor operator license does not confirm that the vendor 140 can generate transactions), the client device 150 will determine at step 535 that the client license provided by shop node 110 may be fraudulent. In this case, the client device 150 can take appropriate steps such as contacting the vendor 140, software manufacturer, or the like to confirm the validity of the transaction.

Figure 6:
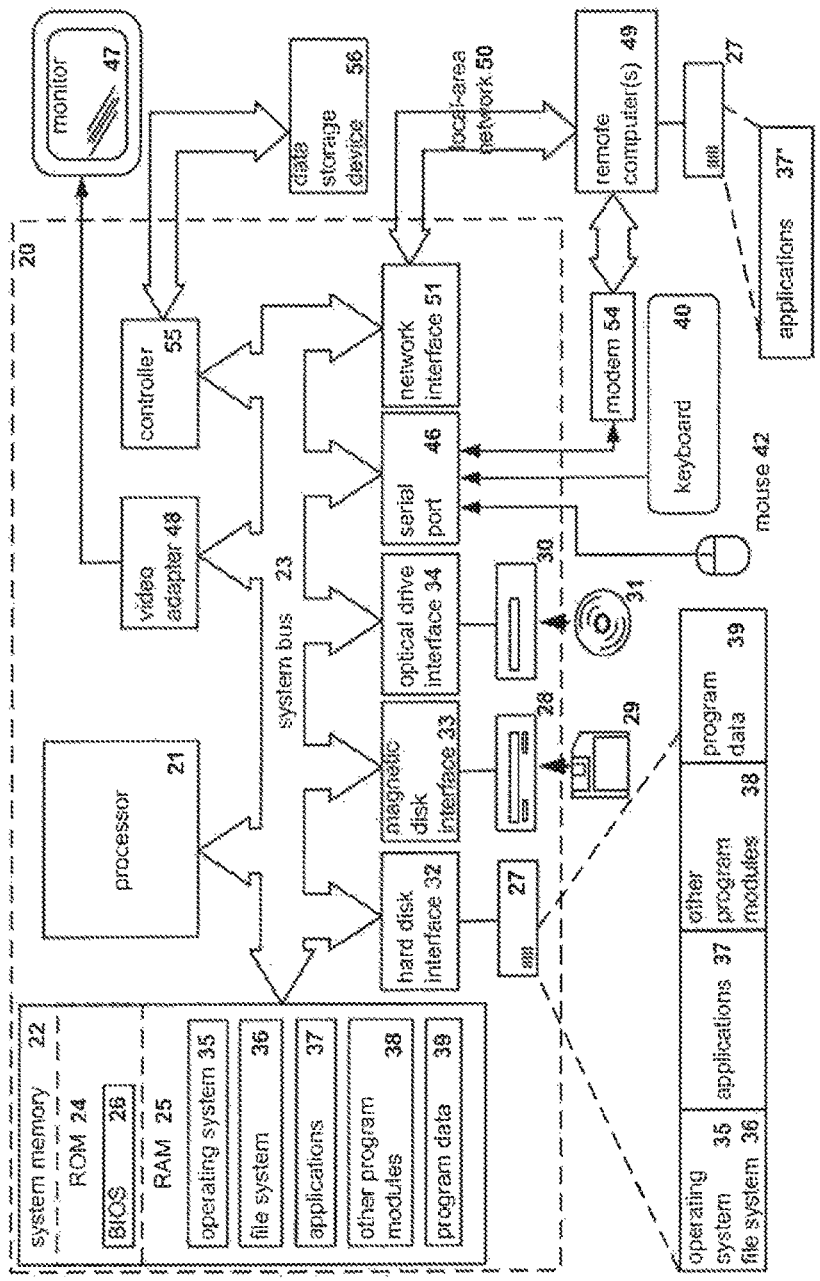
FIG. 6 illustrates an example of a general-purpose computer system on which the disclosed systems and method can be implemented.

FIG. 6 illustrates an example of a general-purpose computer system (which may be a personal computer or a server) on which the disclosed systems and method can be implemented according to an example aspect. It should be appreciated that the detailed general-purpose computer system can correspond to the node 110 and/or database 120 provided to implement the algorithms described above.

As shown, the computer system 20 includes a central processing unit 21, a system memory 22 and a system bus 23 connecting the various system components, including the memory associated with the central processing unit 21. The central processing unit 21 can correspond to the CPU 210 and the system memory 22 can correspond to database 120 of FIG. 3, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method utilizing blockchain technology for managing services and licenses, the method comprising:
    storing, in an electronic database, an operator license relating to an operator node associated with a vendor, the operator license indicating transactional authority of the operator node, the transactional authority indicating that the operator node is authorized to perform at least one of: purchase a license, purchase a service, and generate a transaction;
    executing, by a processor of the operator node, a transaction relating to at least one of a service and a license provided to client device;
    transmitting data relating to the operator license to a blockchain network in which at least one node in the blockchain network adds the data relating to the operator license as one or more blocks in an existing blockchain; and
    replicating the transaction to at least one additional node in the blockchain network, such that the existing blockchain is used to verify the transaction authority of the operator node and the transaction between the client device and the operator node, the verifications being to determine whether the transaction is to be accepted.

2. The method according to claim 1, wherein the operator node is the at least one node in the blockchain network.

3. The method according to claim 1, further comprising:
    transmitting additional data to the at least one node in the blockchain network, the additional data relating to at least one of a timestamp, a transaction type and vendor custom properties of the transaction.

4. The method according to claim 3, wherein the timestamp indicates a time and date when the transaction was executed between the client device and the vendor.

5. The method according to claim 1, further comprising:
    transmitting a vendor operator license associated with a transactional authority of the vendor to the blockchain network to be added as the one or more blocks in the existing blockchain.

6. The method according to claim 5, wherein the executing of the transaction includes providing a client license and the transaction to the client device, wherein the transaction includes the vendor operator license.

7. The method according to claim 6, wherein the client device is configured to validate the transaction based on the transaction and the one or more blocks in the existing blockchain.

8. A system utilizing blockchain technology for managing services and licenses, the system comprising:
    an electronic database configured to store an operator license relating to an operator node associated with a vendor, the operator license indicating transactional authority of the operator node, the transactional authority indicating that the operator node is authorized to perform at least one of: purchase a license, purchase a service, and generate a transaction; and
    a processor of the operator node being configured to:
        execute a transaction relating to at least one of a service and a license provided to client device,
        transmit data relating to the operator license to a blockchain network in which at least one node in the blockchain network adds the data relating to the operator license as one or more blocks in an existing blockchain, and
        cause the transaction to be replicated by at least one additional node in the blockchain network, such that the existing blockchain is used to verify the transaction authority of the operator node and the transaction between the client device and the operator node, the verifications being to determine whether the transaction is to be accepted.

9. The system according to claim 8, wherein the operator node is the at least one node in the blockchain network.

10. The system according to claim 8, wherein the processor is further configured to:
    transmit additional data to the at least one node in the blockchain network, the additional data relating to at least one of a timestamp, a transaction type and vendor custom properties of the transaction.

11. The system method according to claim 10, wherein the timestamp indicates a time and date when the transaction was executed between the client device and the vendor.

12. The system according to claim 8, wherein the processor is further configured to:
    transmit a vendor operator license associated with a transactional authority of the vendor to the blockchain network to be added as the one or more blocks in the existing blockchain.

13. The system according to claim 12, wherein the processor is further configured to execute the transaction by providing a client license and the transaction to the client device, wherein the transaction includes the vendor operator license.

14. The system according to claim 13, wherein the client device is configured to validate the transaction based on the transaction and the one or more blocks in the existing blockchain.

15. A non-transitory computer readable medium comprising computer executable instructions for utilizing blockchain technology for managing services and licenses, including instructions for:
    storing, in an electronic database, an operator license relating to an operator node associated with a vendor, the operator license indicating transactional authority of the operator node, the transactional authority indicating that the operator node is authorized to perform at least one of: purchase a license, purchase a service, and generate a transaction;
    executing, by a processor of the operator node, a transaction relating to at least one of a service and a license provided to client device;
    transmitting data relating to the operator license to a blockchain network in which at least one node in the blockchain network adds the data relating to the operator license as one or more blocks in an existing blockchain; and
    replicating the transaction to at least one additional node in the blockchain network, such that the existing blockchain is used to verify the transaction authority of the operator node and the transaction between the client device and the operator node, the verifications being to determine whether the transaction is to be accepted.

16. The non-transitory computer readable medium according to claim 15, wherein the operator node is the at least one node in the blockchain network.

17. The non-transitory computer readable medium according to claim 15, further including instructions for:
    transmitting additional data to the at least one node in the blockchain network, the additional data relating to at least one of a timestamp, a transaction type and vendor custom properties of the transaction.

18. The non-transitory computer readable medium according to claim 15, further including instructions for:
   transmitting a vendor operator license associated with transactional authority of the vendor to the blockchain network to be added as the one or more blocks in the existing blockchain.

19. The non-transitory computer readable medium according to claim 18, wherein the executing of the transaction includes instructions for providing a client license and the transaction to the client device, wherein the transaction includes the vendor operator license.

20. The non-transitory computer readable medium according to claim 19, further including instructions for validating, by the client device, the transaction based on the transaction and the one or more blocks in the existing blockchain.

* * * * *